(12) United States Patent
Hartikainen et al.

(10) Patent No.: US 11,014,831 B2
(45) Date of Patent: May 25, 2021

(54) WATER TREATMENT

(71) Applicant: UPM-KYMMENE CORPORATION, Helsinki (FI)

(72) Inventors: Helinä Hartikainen, Helsinki (FI); Salla Venäläinen, Helsinki (FI); Markus Nuopponen, Helsinki (FI); Anne Meriluoto, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 616 days.

(21) Appl. No.: 15/571,021

(22) PCT Filed: May 4, 2016

(86) PCT No.: PCT/FI2016/050284
§ 371 (c)(1),
(2) Date: May 17, 2018

(87) PCT Pub. No.: WO2016/181035
PCT Pub. Date: Nov. 17, 2016

(65) Prior Publication Data
US 2019/0031533 A1 Jan. 31, 2019

(30) Foreign Application Priority Data

May 13, 2015 (FI) .................................... 20155350

(51) Int. Cl.
*C02F 1/28* (2006.01)
*B01J 20/24* (2006.01)
(Continued)

(52) U.S. Cl.
CPC ............... *C02F 1/286* (2013.01); *B01J 20/24* (2013.01); *B01J 20/28007* (2013.01);
(Continued)

(58) Field of Classification Search
None
See application file for complete search history.

(56) References Cited

U.S. PATENT DOCUMENTS 2,206,007 A * 6/1940 Liebknecht .............. B01J 39/24
210/664
2013/0180917 A1 7/2013 Chu et al.
2019/0039918 A1* 2/2019 Hartikainen .......... C02F 1/5263

FOREIGN PATENT DOCUMENTS

CN 103272568 A 9/2013
CN 103554510 A 2/2014
(Continued)

OTHER PUBLICATIONS

Ma et al, Ultrafine Cellulose Nanofibers as Efficient Adsrobents for Removal of UO22+ in Water, Dec. 2011, ACS Macro Letters, ACS Publications, pp. 213-216. (Year: 2011).*
(Continued)

*Primary Examiner* — Matthew O Savage
(74) *Attorney, Agent, or Firm* — Nixon Peabody LLP (57) ABSTRACT

The present invention concerns a process for removing metal ions from waste water, which process comprises providing plant-derived anionic nanofibrillar cellulose, carrying out a purification treatment comprising sorption of positively charged metal ions contained in the waste water to said nanofibrillar cellulose, separating used plant-derived anionic nanofibrillar cellulose from the waste water, and recovering treated waste water. The invention also concerns use of plant-derived anionic nanofibrillar cellulose for removing metal ions from waste water.

18 Claims, 2 Drawing Sheets

(51) Int. Cl.
- *C02F 1/38* (2006.01)
- *C08B 11/12* (2006.01)
- *B01J 20/28* (2006.01)
- *C08L 1/28* (2006.01)
- *C08L 1/02* (2006.01)
- *C02F 1/52* (2006.01)
- *C02F 101/10* (2006.01)
- *C02F 101/20* (2006.01)

(52) U.S. Cl.
CPC ........... *B01J 20/28023* (2013.01); *C02F 1/38* (2013.01); *C02F 1/5263* (2013.01); *C08B 11/12* (2013.01); *C08L 1/02* (2013.01); *C08L 1/286* (2013.01); *B01J 2220/4825* (2013.01); *C02F 2101/101* (2013.01); *C02F 2101/20* (2013.01); *C02F 2101/203* (2013.01); *C02F 2101/206* (2013.01); *C02F 2305/08* (2013.01)

(56) References Cited

FOREIGN PATENT DOCUMENTS

| | | | |
|---|---|---|---|
| EP | 2657194 A1 | 10/2013 | |
| EP | 2782937 A1 | 10/2014 | |
| FI | 20135423 A | 10/2014 | |
| JP | 2010-253454 A | 11/2010 | |
| WO | WO 2001/066600 A1 | 9/2001 | |
| WO | 2015015056 A1 | 2/2015 | |
| WO | WO-2015169682 A1 * | 11/2015 | .......... B01J 20/3433 |

OTHER PUBLICATIONS

Aroua et al. ("Removal of chromium ions from aqueous solutions by polymer-enhanced ultrafiltration", J. Haz. Mat. 3 (2007), pp. 752-758).

Isobe et al. ("TEMPO-oxidized cellulose hydrogel as a high-capacity and reusable heavy metal ion adsorbent", J. Haz. Mat, 260 (2013), pp. 195-201).

Sehaqui et al. ("Enhancing adsorption of heavy metal ions onto biobased nanofibers from waste pulp residues for application in waste water treatment", Cellulose, 21 (2014), pp. 2831-2844).

Suopajarvi et al. ("Coagulation-flocculation treatment of municipal waste water based on anionized nanocelluloses", Chem. Eng. J., 231 (2013) pp. 59-67).

Suopajarvi et al. ("Flocculation of municipal wastewaters with anionic nanocelluloses: Influence of nanocellulose characteristics on floc morphology and strength", J. Env. Chem. Eng., 2 (2014) pp. 2005-2012).

Suopajarvi et al. ("Lead adsorption with sulfonated wheat pulp nanocelluloses", J. Water Process Eng. (2014), http://dx.doi.org/10.1016/j.jwpe.2014.06.003).

Hokkanen et al. ("Removal of heavy metals from aqueous solutions by succinic anhydride modified mercerized nanocellulose", Chem. Eng. J., 223 (2013) pp. 40-47).

Hokkanen et al. ("Adsorption of Ni(II), Cu(II) and Cd(II) from aqueous solutions by amino modified nanostructured microfibrillated cellulose", Cellulose, 21 (2014), pp. 1471-1487).

Hokkanen et al. ("Adsorption of hydrogen sulphide from aqueous solutions using modified nano/micro fibrillated cellulose", Env. Techn., 35 (2014), pp. 2334-2346).

Hokkanen et al. ("Adsorption of Ni2+, Cd2+, PO4 3- and NO3— from aqueous solutions by nanostructured microfibrillated cellulose modified with carbonated hydroxyapatite", Chem. Eng. J., 252 (2014), pp. 64-74).

Hokkanen et al. (Removal of Arsenic(V) onto magnetic Fe3O4 activated Microfibrillated Cellulose (MFC)), Chem. Eng. J., 260 (2015), pp. 886-894)v.

Carpenter A W et al. Cellulose Nanomaterials in Water Treatment Technologies. Environmental Science & Technology 2015, Published Feb. 4, 2015, vol. 49, p. 5277-5287.

Rasim Batmaz et al.: "Cellulose nanocrystals as promising adsorbents for the removal of cationic dyes", Cellulose vol. 21, No. 3, Jan. 18, 2014, pp. 1655-1665.

International Search Report from International Application No. PCT/FI2016/050284 dated Jun. 10, 2016.

Search Report from Finnish Patent Application No. 20155350 dated Sep. 9, 2015.

Finnish Office Action from Patent Application No. 20155350 dated Nov. 20, 2017.

Sanna Flokkanen, Modified Nano- and Microcellulose Based Adsorption Materials in Water Treatment, Thesis, Lappeenranta University of Technology, 2014.

English Translation of Japanese Office Action from JP Patent Application No. 558724/2017 dated Feb. 25, 2020.

Zhou, Y., "Study on Preparation and Characterization of Nanocellulose Composite Gel and Enhancement of Physical and Chemical Properties", China Full-text Database of Excellent Doctoral Dissertations, No. 11, pp. B016-B029 (2014).

Wang, S., "Synthesis of Modified Cellulose Adsorbent and Its Application Research on Adsorption of Heavy Metal Ions", China Full-text Database of Excellent Master Degree Thesis, No. 2, pp. B027-B1112 (2015).

Chinese Office Action in Chinese Patent Application No. CN 201680027052.5, dated Jul. 16, 2020 (20 pages).

\* cited by examiner

WATER TREATMENT

CROSS-REFERENCE TO RELATED APPLICATIONS

This application is a U.S. National Stage Application of International Application No. PCT/FI2016/050284, filed on May 4, 2016, which claims priority to Finnish Patent Application No. 20155350, filed on May 13, 2015, both of which are incorporated by reference herein in their entireties.

FIELD OF THE INVENTION

The present invention relates generally to the use of plant-derived nanofibrillar cellulose in water treatment. More particularly, the invention relates to a process for water treatment or purification utilizing plant-derived anionic nanofibrillar cellulose. Furthermore, the present invention relates to use of plant-derived anionic nanofibrillar cellulose.

BACKGROUND

Water treatment and purification involves removing contaminants in the water or reducing their concentration in order to make the water suitable for its desired end-use, for example for simply returning used water safely into the environment. The industry produces large amounts of waste water that needs to be purified. Waste water treatment chemicals, such as pH conditioners, coagulants, flocculants, antifoam and biocide agents are widely used, but they cause a burden on the environment.

Most contaminant species in water (raw or process water) have either negative or positive net charge. Consequently, the contaminant species with similar charge repel each other. Thus they may not be easily removed by filtration or sedimentation. Quite often the contaminant species are relatively small. It would be easier to remove small contaminant species from water if they can be flocculated first. If contaminant species have spherical shape, as suspended in a fluid medium, they settle at a rate proportional to the fourth power of the particle radius according to Stoke's Law. In order to flocculate contaminant species coagulants and/or flocculants are used.

During water purification, waste water is first screened after which the water suspension is coagulated and flocculated with the aid of chemicals. The flocculated material is then sedimented and the rest of the water is directed to filtration and disinfection processes.

Some major industries for sludge treatment chemicals are metal-processing industry, oil and gas industry, electronics industry, paints and coatings industry, power plants, textile industry, food and beverage industry, paper and pulp industry, chemicals and personal care industry, mining industry and agriculture.

Current solutions for water purification are based mainly on polyacrylamides, PolyDADMAC and aluminum sulfates, which cause further environmental burden. Natural flocculants may be based on for example gelatin, guar gum and linear polysaccharide.

There is a need for more environmentally friendly purification processes and chemicals. Furthermore, there is a need for solutions which also are economically feasible.

Aroua et al. ("Removal of chromium ions from aqueous solutions by polymer-enhanced ultrafiltration", *J. Haz. Mat.* 3 (2007), pp 752-758) have studied the removal of chromium species using polymer-enhanced ultrafiltration (PEUF) process. Three water soluble polymers, namely chitosan, polyethyleneimine (PEI) and pectin were used.

Also micro- or nanofibrillar celluloses have found applications also in the area of water treatment. Nanofibrillar celluloses (NFC or nanocellulose) can be derived from cellulose containing material, such as wood and other plant material. Nanocelluloses have recently found applications in various areas. In higher plants, cellulose is organized in morphologically complex structure consisting of $\beta(1\rightarrow4)$ D-glucopyranose chains. These chains are laterally bound by hydrogen bonds to form fibrils with a diameter in nanoscale, which are further organized in microfibril bundles. Furthermore, cellulose molecules are associated with other polysaccharides (hemicelluloses) and lignin in plant cell walls, resulting in even more complex morphologies. The cellulose micro- or nanoscale fibers can be released from the highly ordered structure by mechanical processes, optionally combined with other treatments such as chemical or enzymatic pretreatment of the cellulosic raw material. The microfibrillar or nanofibrillar celluloses obtained after mechanical processing may also be subjected to e.g. chemical treatment.

Isobe et al. ("TEMPO-oxidized cellulose hydrogel as a high-capacity and reusable heavy metal ion adsorbent", *J. Haz. Mat.*, 260 (2013), pp 195-201) discloses studies with TEMPO-oxidized cellulose hydrogel for adsorption of toxic metal ions, such as copper ($Cu^{2+}$), zinc ($Zn^{2+}$), iron ($Fe^{3+}$), cadmium ($Cd^{2+}$), and cesium ($Cs^+$).

Sehaqui et al. ("Enhancing adsorption of heavy metal ions onto biobased nanofibers from waste pulp residues for application in waste water treatment", *Cellulose*, 21 (2014), pp 2831-2844) concerns the use of cellulose and chitin nanofibers functionalized with carboxylate entities prepared from pulp residue and crab shells, respectively, by chemically modifying the initial raw materials with 2,2,6,6-tetramethyl-1-piperidinyloxy (TEMPO) mediated oxidation. The adsorption capacity of oxidized cellulose nanofibers for metal ions, including copper(II), nickel(II), chromium(III) and zinc(II) was studied.

Suopajärvi et al. ("Coagulation-flocculation treatment of municipal waste water based on anionized nanocelluloses", *Chem. Eng. J.*, 231 (2013) pp 59-67) discloses dicarboxylic acid nanocellulose (DCC) flocculants produced by nanofibrillation of periodate and chlorite-oxidized celluloses with a homogenizer. The flocculation performance levels of five anionic nanocelluloses with variable charge densities were examined in the coagulation-flocculation treatment of municipal waste water and the results compared with the performance of a commercial coagulant and a synthetic polymeric flocculant.

Suopajärvi et al. ("Flocculation of municipal wastewaters with anionic nanocelluloses: Influence of nanocellulose characteristics on floc morphology and strength", *J. Env. Chem. Eng.*, 2 (2014) pp 2005-2012) concerns testing the flocculation performance of anionic sulfonated (ADAC) nanocellulose flocculants, with variable charge densities in combined coagulation-flocculation treatment of municipal wastewater and compared the results with the performance of a commercial coagulant and a synthetic polymeric flocculant.

Suopajärvi et al. ("Lead adsorption with sulfonated wheat pulp nanocelluloses", *J. Water Process Eng.* (2014), http://dx.doi.org/10.1016/j.jwpe.2014.06.003) describes studies where wheat straw pulp fine cellulosics were used as a biosorbent for the removal of Pb(II) in aqueous solutions after nanofibrillation and sulfonation pretreatments.

Hokkanen et al. ("Removal of heavy metals from aqueous solutions by succinic anhydride modified mercerized nanocellulose", *Chem. Eng. J.*, 223 (2013) pp 40-47) studied the removal of Zn(II), Ni(II), Cu(II), Co(II), and Cd(II) ions from aqueous solutions was investigated. Microfibrillated cellulose (MFC) was used, which was mercerized and then reacted with succinic anhydride.

Hokkanen et al. ("Adsorption of Ni(II), Cu(II) and Cd(II) from aqueous solutions by amino modified nanostructured microfibrillated cellulose", *Cellulose*, 21 (2014), pp 1471-1487) concerns investigating the adsorption properties of aminopropyltriethoxysilane (APS) modified microfibrillated cellulose (MFC) in aqueous solutions containing Ni(II), Cu(II) and Cd(II) ions. Microfibrillated cellulose was used and it was reacted with a coupling agent, APTES, to obtain modified microfibrillated cellulose.

Hokkanen et al. ("Adsorption of hydrogen sulphide from aqueous solutions using modified nano/micro fibrillated cellulose", *Env. Techn.*, 35 (2014), pp 2334-2346) concerns a study where microfibrillated cellulose (MFC) was modified by aminopropyltriethoxysilane (APS), hydroxycarbonated apatite (HAP), or epoxy in order to produce novel nanostructured adsorbents for the removal of hydrogen sulphide ($H_2S$) from aqueous solutions.

Hokkanen et al. ("Adsorption of $Ni^{2+}$, $Cd^{2+}$, $PO_4^{3-}$ and $NO_3^-$ from aqueous solutions by nanostructured microfibrillated cellulose modified with carbonated hydroxyapatite", *Chem. Eng. J.*, 252 (2014), pp 64-74) describes adsorption studies of $Ni^{2+}$, $Cd^{2+}$, $PO_4^{3-}$ and $NO_3^-$ by carbonated hydroxyapatite (CHA) modified microfibrillated cellulose (MFC) was studied in the aqueous solution.

Hokkanen et al. ("Removal of Arsenic(V) onto magnetic $Fe_3O_4$ activated Microfibrillated Cellulose (MFC)), *Chem. Eng. J.*, 260 (2015), pp 886-894) concerns a study using magnetic iron nanoparticles modified microfibrillated cellulose (FeNP/MFC) for arsenate (As(V)) removal from aqueous solutions.

BRIEF DESCRIPTION OF THE INVENTION

Even though many advances have been made in the field of water treatment, there is still a need to provide improved purification chemicals and processes. More efficient and environmentally friendly chemicals and processes are needed for advanced water purification and sludge treatment. Advanced water purification may involve, for example, either removing specific contaminants from the waste water or removing a large scale of different contaminants.

The present invention thus concerns a process for removing ions from waste water as well as the use of anionic nanofibrillar cellulose in water treatment. More specifically the invention concerns the use of plant-derived anionic nanofibrillar cellulose in water treatment for removing metal ions. The water to be treated may be for example waste water or another aqueous solution in need of purification.

One aspect of the invention is to provide an environmental friendly water treatment chemical or additive for improved advanced purification of waste water.

The invention is based on the surprising finding that plant-derived anionic nanofibrillar cellulose is capable of binding, from the water to be treated, a net charge of ions which is higher than its own net charge. Further, the inventors have also discovered that the plant-derived anionic nanofibrillar cellulose is able to remove both positively charged contaminant species and negatively charged contaminant species from the water. Thus, despite the anionic charge of the nanofibrillar cellulose itself, it is able to trap and remove also negatively charged contaminant species for example oxyanions such as sulfate ions.

Although the reaction mechanism is not completely known, it has been proposed that the anionic nanofibrillar cellulose used in the present invention first binds cationic components, such as metal ions, from the water. After that the cationic components already bound to the nanofibrillar cellulose can participate in the removing of anionic components from the water to be treated.

It is thus believed that plant-derived anionic nanofibrillar cellulose used in the invention is able to form complexes with cationic and anionic components leading to flocculated particles which can be removed easily from waste water. In addition to chemical bonds, the nanofibrillar cellulose probably binds further ions mechanically by trapping them in the bulky complexes that are formed when mixing the nanofibrillar cellulose and waste water. Furthermore, it is believed that the nanofibrillar celluloses catches contaminants, i.e. positively or negatively charged contaminant species when water passes through the hydrogel structure of the nanofibrillar cellulose, e.g. by filtration or centrifugation. The plant-derived anionic nanofibrillar celluloses used in this invention would thus be able to form gel matrixes like a layer of hydrogel on a top of for example a filtration fabric or membrane, which then catches the metals and other impurities passing through.

One objective of the present invention is a process for removing metal ions from waste water. The process comprises the steps of providing plant-derived anionic nanofibrillar cellulose, said plant-derived anionic nanofibrillar cellulose having a zero sheer viscosity of 2,000 to 100,000 Pa·s, and a yield stress of 2 to 50 Pa, when dispersed to a concentration of 0.5 wt.-% in water, using said plant-derived anionic nanofibrillar cellulose in an amount of 0.005 to 25 $kg/m^3$ waste water, based on the dry weight of the nanofibrillar cellulose, to carry out a purification treatment comprising sorption of positively charged metal ions, contained in the waste water, to said plant-derived anionic nanofibrillar cellulose, separating used plant-derived anionic nanofibrillar cellulose from the waste water, and recovering treated waste water.

Another objective of the present invention is the use of plant-derived anionic nanofibrillar cellulose having a zero sheer viscosity of 2,000 to 100,000 Pa·s and a yield stress of 2 to 50 Pa, when dispersed to a concentration of 0.5 wt.-% in water, for removing metal ions from waste water.

Advantages of the present invention include achieving cost-effective and energy-saving process for water purification, including sludge treatment. Typically, the industries require faster and more advanced treatment solutions, usually due to increasingly strict regulations. The nanofibrillar cellulose of the invention works for complex wastewaters, since it removes both anionic and cationic contaminants. Furthermore, the purification effect is high, because the process utilizes both mechanical and chemical means. There is also a need for more environmental friendly, biodegradable chemicals. The nanofibrillar cellulose is bio-based and manufactured from a renewable, abundant resource. In addition it may be disposed of in an environmentally safe manner, if needed it can be burned safely and metals recovered can be recycled. The nanofibrillar celluloses bind metal ions by electrostatic forces and by trapping them onto the surface, thus, the metals can be released and recovered from the hydrogel. Through the new use of nanofibrillar cellulose, the amount of chemicals used in water purification may be decreased.

DEFINITIONS

Unless otherwise specified, the terms, which are used in the specification and claims, have the meanings commonly used in the field of nanocellulose technology, as well as in the field of water treatment and purification. Especially, the following terms have the meanings indicated below.

As used herein, the term "nanofibrillar cellulose" or nanofibrillated cellulose or NFC is understood to encompass nanofibrillar structures liberated from plant based cellulosic materials, such as cellulose pulp from hardwood or softwood. The nomenclature relating to nanofibrillar celluloses is not uniform and there is an inconsistent use of terms in the literature. For example the following terms have been used as synonyms for nanofibrillar cellulose: cellulose nanofiber, nanofibril cellulose (CNF), nanofibrillated cellulose (NFC), nano-scale fibrillated cellulose, microfibrillar cellulose, cellulose microfibrils, microfibrillated cellulose (MFC), and fibril cellulose. The smallest cellulosic entities of cellulose pulp of plant origin, such as wood, include cellulose molecules, elementary fibrils, and microfibrils. Microfibril units are bundles of elementary fibrils caused by physically conditioned coalescence as a mechanism of reducing the free energy of the surfaces. The term "nanofibrillar cellulose" or NFC refers to a collection of cellulose nanofibrils liberated from cellulose pulp or cellulosic material, particularly from the microfibril units. Their diameters vary depending on the source. Nanofibrillar cellulose typically has a high aspect ratio: the length exceeds one micrometer while the diameter is typically below 100 nm. The smallest nanofibrils are similar to the so-called elementary fibrils. The dimensions of the liberated nanofibrils or nanofibril bundles are dependent on raw material, any pretreatments and disintegration method. Intact, unfibrillated microfibril units may be present in the nanofibrillar cellulose. As used herein, the nanofibrillar cellulose is not meant to encompass non-fibrillar, rod-shaped cellulose nanocrystals or whiskers.

The term "anionic nanofibrillar cellulose" refers to nanofibrillar cellulose, which has been chemically derivatized i.e. chemically modified to render the nanocellulose anionic by introducing negative charges on the surface thereof. For the plant-derived anionic nanofibrillar cellulose of the invention, the chemical derivatization is carried out before the production of NFC, i.e. before the mechanical disintegration of the cellulosic raw material.

The term "cellulose pulp" refers to cellulose fibers, which are isolated from any plant based cellulose or lignocellulose raw material, using chemical, mechanical, thermo-mechanical, or chemi-thermo-mechanical pulping processes, for example kraft pulping, sulfate pulping, soda pulping, organosolv pulping. The cellulose pulp may be bleached using conventional bleaching processes.

The term "native cellulose pulp" or "native cellulose" refers here to any cellulose pulp, which has not been chemically modified after the pulping process and the optional bleaching process.

The term "plant-derived" or "plant-derived cellulose material" may be wood and said wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Plant-derived non-wood materials may be for example from agricultural residues, grasses or other plant substances such as straw, leaves, bark, seeds, hulls, flowers, vegetables or fruits from cotton, corn, wheat, oat, rye, barley, rice, flax, hemp, manilla hemp, sisal hemp, jute, ramie, kenaf, bagasse, bamboo or reed, or mixtures of these.

The term "hydrogel" in connection with nanofibrillar cellulose refers to a form where an aqueous dispersion of the nanofibrillar cellulose has a loss tangent less than 1. Hydrogel is a polymeric material that exhibits the ability to swell and retain a significant fraction of water within its structure, but it does not dissolve in water. NFC hydrogels are formed spontaneously without formation of covalent bonds, therefore, their strength can be easily altered e.g. by dilution. The NFC hydrogel has good suspending capacity. The NFC hydrogel is so-called reversible or physical gel involving physical cross-linking by entanglement of fibrils. The interactions in the network can be disrupted by application of stress, so NFC hydrogels have shear-thinning behavior. The viscoelastic properties of plant-derived nanofibrillar cellulose hydrogel scaffold differs considerably from nanofibrillar cellulose from other sources, such as from bacterial cellulose scaffolds.

Term "dispersion" in connection with nanofibrillar cellulose encompasses both hydrogels of nanofibrillar cellulose but also more dilute aqueous system not fulfilling the above requirement related to hydrogel. A dispersion is a system in which particles are dispersed in a continuous phase of a different state than the particles themselves.

DETAILED DESCRIPTION OF THE INVENTION

The present invention concerns the use of anionic nanofibrillar cellulose as a water treatment chemical or water treatment additive. More specifically, the invention concerns a process for removing contaminants in the form of metal ions from waste water using plant-derived anionic nanofibrillar cellulose. Contaminants which are removed may also comprise ions with a negative net charge, such as oxyanions or other ions with a positive net charge.

Nanofibrillar cellulose in general is characterized by very high water retention capacity, a high degree of chemical accessibility and the ability to form stable gels in water or other polar solvents. A nanofibrillar cellulose product is typically a dense network of highly fibrillated cellulose elementary fibrils and bundles of elementary fibrils. Nanofibrillar cellulose may also contain some hemicelluloses; the amount is dependent on the plant source and pulping conditions.

The nanofibrillar cellulose of the present invention is plant-derived i.e. derived from plant based cellulosic material.

To obtain nanofibrillar cellulose with the desired properties and dimensions; mechanical disintegration of cellulosic raw material, i.e. plant-derived cellulose material, may be carried out with suitable equipment, such as a refiner, grinder, homogenizer, colloider, friction grinder, ultrasound-sonicator, fluidizer such as microfluidizer, macrofluidizer or fluidizer-type homogenizer.

Different types of nanofibrillar celluloses have different properties depending on the manufacturing method, degree of fibrillation and chemical composition. Several grades of NFC have been developed using various production techniques. The grades may have different properties and the chemical compositions of the grades also vary. Depending on the raw material source, e.g. hardwood vs. softwood pulp, different polysaccharide composition exists in the final nanofibrillar cellulose product.

The nanofibrillar cellulose of the present invention is anionic nanofibrillar cellulose. The anionic nanofibrillar cellulose is obtained through anionization. Anionization is an example of chemical derivatization, i.e. a chemical modification. Anionization, or producing anionic nanofibrillar cellulose, is a modification to render the nanocellulose anionic by introducing negative charges on the surface thereof. One example of anionization is anionizing by TEMPO ((2,2,6,6-tetramethylpiperidin-1-yl)oxyl) oxidation. Other examples are carboxymethylation and sulphonation. The reactions are performed as a pretreatment of cellulose pulp or other cellulosic raw material, before mechanical disintegration or liberated of the nanofibrils in other ways. The outcome of the processes is a charged anionic nanofibrillar cellulose. Typically, all of the raw material is modified and possible amounts of non-modified cellulose are insignificant.

The nanofibrillar celluloses particularly suitably for use in the present invention are selected from plant-derived anionic nanofibrillar celluloses and/or any combinations of different anionized nanofibrillar celluloses. Typically, the anionic nanofibrillar cellulose used in the present invention are native celluloses which have been subjected to anionization, or alternatively modified celluloses which have been subjected to anionization.

Physical derivatization of cellulose to anionic cellulose may be performed by physical adsorption of anionic substances on the cellulose surface.

Derivatized grades are typically prepared from bleached cellulosed pulps. Any hemicelluloses present may also be derivatized in the derivatized grades of NFC.

Examples of production of nanofibrillar celluloses has been described for example in EP2782937 where carboxymethylation is described and in WO 2015/015056 where oxidation is described.

Derivatized grades of nanofibrillar cellulose usually have smaller diameters and narrower size distributions than native or non-derivatized grades of nanofibrillar cellulose. The smaller the fibrils size, the larger is the surface area and thus the effective charged surface. When cellulose has been derivatized, it is more labile and easier to disintegrate. Generally, the smaller fibril sized accomplished through the anionic derivatization is beneficial for the present invention.

The derivatized nanofibrillar celluloses are typically thinner than native nanofibrillar celluloses. The number average diameter for plant-derived anionic nanofibrillar cellulose may vary between 2 and 200 nm, or between 2 and 100 nm. Preferably, the number average diameter for plant-derived anionic nanofibrillar cellulose is 2-20 nm or 2-10 nm, more preferably 3-6 nm. The smallest nanofibrils are similar to so called elementary fibrils, which are typically 2-12 nm in diameter. The above values are estimated from Cryo-TEM images. The dimensions of the nanofibrils or nanofibril bundles are dependent on raw material and disintegration method. The length of nanofibrillar cellulose is somewhat challenging to measure accurately. The plant-derived anionic nanofibrillar cellulose typically have lengths varying between 0.3 and 50 micrometers or 0.3 and 20 micrometers. Preferably, the length is 0.5-20 micrometers or 0.5-10 micrometers, and more preferably 1-10 micrometers or 1-5 micrometers. The lengths depend on the anionization method used. The above values are estimated from electron microscopy or AFM images.

The degree of fibrillation can be evaluated from fiber analysis where the number of larger, only partially fibrillated entities, are evaluated. For the plant-derived anionic nanofibrillar cellulose the number of those unfibrillated particles per mg of dry sample varies from 1 to 10 000, preferably between 1 and 5000, most preferably between 1 and 1000. The fiber analysis may suitably be carried out using Fiber-Lab analysis method.

Nanofibrillar celluloses form hydrogel structures with a desired viscosity when dispersed in an aqueous medium, such as water. Any suitable mixing or blending apparatus may be used to form the hydrogel.

The rheology of plant-derived nanofibrillar cellulose hydrogels show reversible gelation. At high stress levels a fluid-like behavior is observed whereas at low stress levels and quiescent conditions a step-wise transition to solid-like behavior occurs. Since a change in the environment does not trigger conformational changes of the polymer chains of the nanofibrillar cellulose hydrogel, the gel strength is almost constant over very broad temperature, pH, or ionic strength ranges. The anionic nanofibrillar cellulose of the invention is thus suitable to use in different types of waste waters, although the composition and pH value of different waste waters may vary broadly. In tests performed in connection with the present invention the pH value of the waste water was rather low, around pH 3. The tests were successful even though no pH adjustment chemicals were used, which is an advantage of the present invention.

In the tests performed in connection with the present invention it was found that the plant-derived anionic nanofibrillar cellulose of the invention is particularly suitable for removing charged contaminants, such as metal ions and/or anions such as oxyanions, from waste water or aqueous solutions. It was shown that the plant-derived anionic nanofibrillar cellulose is capable of binding a net charge of ions that is higher than its own net charge. Theoretically, it was expected that the net charge of removed metals would be the same as the charge of the nanofibrillar cellulose. Furthermore, it was discovered that the plant-derived anionic nanofibrillar cellulose of the invention is able to remove both positively charged contaminant species and negatively charged contaminant species from the water to be treated.

According to one aspect the present invention concerns a process for removing charged contaminants from waste water characterized in that the process comprises the steps of contacting waste water and plant-derived anionic nanofibrillar cellulose in an amount of 0.005 to 20 kg of plant-derived anionic nanofibrillar cellulose per $m^3$ of waste water based on the dry weight of the nanofibrillar cellulose to facilitate sorption of positively charged metal ions contained in the waste water to said nanofibrillar cellulose, recovering treated waste water, and recovering plant-derived anionic cellulose and the sorbed charged contaminants.

According to one embodiment of the invention the process or use comprises adding plant-derived anionic nanofibrillar cellulose to waste water in an amount of 0.01 to 20 kg/$m^3$ or using 0.01 to 20 kg of plant-derived anionic nanofibrillar cellulose per $m^3$ of waste water based on the dry weight of the nanofibrillar cellulose. The amount may be also in the range of 0.1 to 20 kg of plant-derived anionic nanofibrillar cellulose per $m^3$ of waste water, such as for example 0.5 to 20 kg of plant-derived anionic nanofibrillar cellulose per $m^3$ of waste water or 1.0 to 15 kg of plant-derived anionic nanofibrillar cellulose per $m^3$ of waste water. Preferably, the amount is 0.1 to 10 kg of plant-derived anionic nanofibrillar cellulose per $m^3$ of waste water, or more preferably 0.5 to 5 kg of plant-derived anionic nanofibrillar cellulose per $m^3$ of waste water based on the dry weight of the nanofibrillar cellulose.

In the tests performed in connection with the present invention it was found that rather low amounts, compared to prior art solutions, of the plant-derived anionic nanofibrillar cellulose may be used in the invention and still contaminants are efficiently removed from the waste water. The lower amounts of NFC enable an economically feasible process, which may be used in industrial scale applications. Lower amounts may be used partly, because the NFC of the invention was found to be able to trap a net charge of ions that is higher than its own net charge. One of the reasons for the efficient removal of contaminants obtained by the process of the present invention is believed to be the quality of the NFC, which is characterized by its zero shear viscosity, yield stress, degree of substitution values, and, where applicable, carboxylate content.

Nanofibrillar celluloses may form hydrogels in water. The stiffness of the nanofibrillar cellulose hydrogels can be evaluated from viscoelastic measurements of the gels. The stiffness of the nanofibrillar cellulose hydrogels reflects also ease of spreading of the hydrogels. When the viscosity is plotted as function of applied shear stress, a dramatic decrease in viscosity is seen after exceeding the critical shear stress.

The zero shear viscosity and the yield stress are important rheological parameters to describe the suspending power of the materials. These two parameters clearly separate different grades of nanofibrillar cellulose.

In connection with the present invention it was surprisingly found that nanofibrillar cellulose with certain viscosity properties can be used in water purification in a particularly effective way. In the nanofibrillar cellulose used in the invention, the length of the nanofibers in average is long enough to form fiber networks enhancing the gel forming ability of the NFC. The length of the fibers in the NFC correlates with the viscosity parameters, zero shear viscosity and the yield stress, of the hydrogel. The fiber networks and gel formed by the anionic nanofibrillar cellulose in water enables the efficient trapping of charged contaminants, which has been achieved with the present invention.

According to one embodiment of the invention the plant-derived anionic nanofibrillar cellulose has a zero shear viscosity of 2,000 to 100,000 Pa·s when dispersed to a concentration of 0.5 wt.-% in water. Preferably, the plant-derived anionic nanofibrillar cellulose has a zero shear viscosity of 5,000 to 50 000 Pa·s when dispersed to a concentration of 0.5 wt.-% in water, most preferably 10 000 to 50 000 Pa·s. The zero-shear viscosity may be for example 20,000 Pa·s, 30,000 Pa·s or 40,000 Pa·s when dispersed to a concentration of 0.5 wt.-% in water.

According to one embodiment of the invention the plant-derived anionic nanofibrillar cellulose has a yield stress of 2 to 50 Pa when dispersed to a concentration of 0.5 wt.-% in water. The yield stress may also be in the range of 3 to 20 Pa when dispersed to a concentration of 0.5 wt.-% in water. The yield stress may be for example 4, 5, 6, 7, 8, 9, 10, 11, 12, 13, 14 or 15, 16, 17, 18, 19 Pa when dispersed to a concentration of 0.5 wt.-% in water.

According to one embodiment of the invention the plant-derived anionic nanofibrillar cellulose comprises nanofibrillar cellulose manufactured from oxidized cellulosic raw material having a carboxylate content above 0.5 mmol/g, preferably 0.5-1.6 mmol/g, more preferably 0.65-1.4 mmol/g, even more preferably 0.75-1.2 mmol/g based on the weight of the cellulosic raw material.

Degree of polymerization (DP) of cellulose is the number of glucose units that make up one polymer molecule. The DP values of cellulose nanofibrils correlates with the aspect ratio of the nanofibrils, and may thus be used for evaluating their length. High DP values are desirable for the nanofibrillar cellulose used in the invention, because it increases the inherent tensile strength of the cellulose and, thus, increases the strength of the hydrogel. On the other hand, for example strongly hydrolyzed fibers, due to for example enzymatic treatment or certain chemical treatments, show substantially reduced fiber length and DP values, and such material is closer to micro—and nanocrystalline cellulose, and the resulting microfibrils are expected to have low aspect ratio.

According to one embodiment of the invention the plant-derived anionic nanofibrillar cellulose consists essentially of cellulose I (cellulose crystal I form). Several different crystalline structures of cellulose are known. The structures correspond to the location of hydrogen bonds between and within strands of the cellulose. Natural cellulose is cellulose I. Cellulose in regenerated cellulose fibers is cellulose II. Cellulose of higher plants consists mainly of the substructure cellulose I.

According to one embodiment the plant-derived anionic nanofibrillar cellulose is TEMPO oxidized nanofibrillar cellulose. The plant-derived anionic nanofibrillar cellulose may be obtained by a TEMPO oxidation process comprising the steps of firstly, oxidizing primary alcohols of cellulose to aldehydes and carboxylic acids through TEMPO oxidation by using sodium hypochlorite as the main oxidant to obtain oxidized cellulose with a certain carboxylate content, and thereafter fibrillating the oxidized pulp to obtain anionic nanofibrillated cellulose. The plant-derived anionic nanofibrillar cellulose of the invention may be TEMPO oxidized nanofibrillar cellulose having aldehyde groups in an amount of less than or equal to 0.3 mmol/g, preferably less than or equal to 0.2 mmol/g, more preferably less than or equal to 0.15 mmol/g by dry weight of the nanofibrillar cellulose.

The chemical composition or modification of nanofibrillar celluloses is commonly described as the degree of substitution (DS). Derivatization by anionization of the cellulose raw material used in the present invention is conducted to certain degree of substitutions levels prior to fibrillation/mechanical disintegration. The degree of substitution in the chemical derivatization process can vary broadly.

According to one embodiment of the invention the plant-derived anionic nanofibrillar cellulose comprises nanofibrillar cellulose manufactured from anionized cellulosic raw material having a degree of substitution (ds or DS) of at least 0.08. The degree of substitution for the plant-derived anionic nanofibrillar celluloses is typically between ds levels 0.08 and 0.3. Preferably, the degree of substitution for the plant-derived anionic nanofibrillar cellulose is between 0.1 and 0.25, or more preferably between 0.12 and 0.2. The degree of substitution may for example be 0.10, 0.11, 0.12, 0.13, 0.14, 0.15, 0.16, 0.17, 0.18 or 0.19. These specific ds levels were found to be advantageous in the present invention, because with these ds levels the anionic nanofibrillar cellulose obtained after mechanical treatment has optimal properties. A hydrogel of good quality was obtained having high viscosity and high aspect ratio. In addition, the energy needed for grinding was kept on a moderate level.

According to one embodiment of the invention the plant-derived anionic nanofibrillar cellulose comprises nanofibrillar cellulose manufactured from carboxymethylated cellulosic raw material having a degree of substitution above 0.1, preferably between 0.1 and 0.3, more preferably between 0.12 and 0.2.

According to one embodiment of the invention the pH value of the waste water is below 4. The pH of the waste water may also be below pH 3. Also other pH values are possible, such as for example pH 5, pH 6, and pH 7.

An advantage of the present invention is that no pH adjustment is necessary. In the tests the pH of waste water was 2-3 which is relatively low. It was not obvious that the nanofibrillar cellulose would be able to remove ions at such low pH values.

According to one embodiment of the invention the ions to be removed comprise metal ions. Preferably, the metal ions include at least one selected from the group consisting of sodium, aluminum, iron, manganese, nickel and zinc ions, more preferably, the metal ions include at least one selected from the group consisting of sodium, aluminum and iron ions and more preferably, the metal ions include sodium ions.

According to one embodiment of the invention the process comprises removing negatively charged contaminants from the waste water. The negatively charged contaminants to be removed comprise anions. Preferably, the anions include at least one oxyanion selected from the group consisting of sulfate, sulfite, nitrate, phosphate, selenate, selenite, antimonite, dichromate and arsenate ions. Most preferably the anions comprise sulfate ions. According to one embodiment the anions consist of sulfate and/or sulfite ions.

The purification treatment step may be continued as long as needed to obtain the desired results. The required time may vary depending on the other parameters of the water treatment, such as the amount of anionic nanofibrillar cellulose used. The purification treatment step may be continued for less than one hour or it may be continued for several hours, for example 2, 3 or 4 hours. According to one embodiment of the invention, the purification treatment step is continued for at least 5 h, at least 7 h, or at least 10 h. Optionally and if necessary, the purification treatment may be carried out even longer, such as at least 12 h, or at least 15 h, or at least 24 h.

According to one embodiment of the invention, the process is a batch process. Optionally, the process may be repeated, i.e. used nanofibrillar cellulose may be removed and new added. This may enhance the purification efficiency.

According to another embodiment of the invention, the process is a continuous process.

Optionally, the plant-derived anionic nanofibrillar cellulose of the invention may contain additives.

The plant-derived anionic nanofibrillar cellulose may be added to the waste water in form of a hydrogel or a dispersion. It may also be used in a concentrated form such as a granulate, powder or the like. If it is used in a concentrated form, the production process typically comprises a drying step of the nanofibrillar cellulose.

According to one embodiment the plant-derived anionic nanofibrillar cellulose is in a form of a hydrogel comprising from 0.01 to 10 wt.-% of nanofibrillar cellulose. Suitably, the hydrogel comprises from 0.05 to 5 wt.-%, such as from 0.07 to 4 wt.-%, or from 0.1 to 3 wt.-% of nanofibrillar cellulose.

According to another embodiment the anionic nanofibrillar cellulose used in the invention is a concentrated anionic nanofibrillar cellulose in a form of a granulate or powder having a dry content of anionic nanofibrillar cellulose in the range of 10-95 wt.-% based on the weight of the product. This anionic nanofibrillar cellulose is produced by anionic derivatization of the cellulosic raw material followed by mechanical treatment and thereafter drying of the obtained hydrogel, for example by ethanol treatment or pressing. The end product is anionic nanofibrillar cellulose in granulated or powder form.

Especially when the NFC is used in a concentrated form, the process for removing charged contaminants from waste water further comprises a step of pre-dispersing the plant-derived anionic nanofibrillar cellulose in an aqueous solution, such as in pure water or an aliquot of the waste water.

According to one embodiment of the invention the plant-derived anionic nanofibrillar cellulose is in form of a powder containing 10 to 95 wt.-% nanofibrillar cellulose.

Optionally, the process of the invention comprises filtering and/or centrifugation. Filtering may be performed by using e.g. a filter fabric. During filtering, nanofibrillar cellulose dispersed in the waste water is able to form a hydrogel layer itself on top of the filter fabric. A layer of nanofibrillar cellulose hydrogel may also be pre-formed onto a filter fabric, after which waste water containing no NFC or containing additional NFC dispersed therein is passed through the preformed hydrogel layer and the filter fabric. Centrifugation may be performed by applying centrifugal forces to waste water containing NFC dispersed therein whereby the NFC is able to form a hydrogel layer while carried by the centrifugal forces.

Thus, according to one embodiment of the present invention the waste water may be passed through a layer of anionic nanofibrillar cellulose hydrogel where the anionic nanofibrillar cellulose layer of hydrogel acts as a membrane itself, improving the purification process. The hydrogel layer is formed by the network of nanofibrils in the hydrogel and enables also mechanical trapping of contaminants i.e. positively or negatively charged contaminant species. The passing through may be carried out by filtration or by centrifugation.

According to one aspect of the invention positively and/or negatively charged contaminants are removed from the waste water by sorption to the plant-derived anionic nanofibrillar cellulose, and/or by mechanical trapping. In other words, contaminant species are trapped into the nanofibril network of the anionic nanofibrillar cellulose.

The nanofibrillar cellulose used in the invention thus has a gel or membrane forming ability, which can be utilized in water treatment or purification according to the use and process of the present invention. This is an advantage over prior art solutions utilizing for example chitosan, pectin and PEI. Chitosan is made from crabs and shrimps and has cationic charge due to amino group. The amino group in chitosan has a $pK_a$ value of approximately 6.5, which leads to a protonation in acidic to neutral solution with a charge density dependent on pH and the % DA-value. This makes chitosan water soluble. Pectin is extracted from citrus fruits. Also pectin is water soluble. Polyethylenimine (PEI) or polyaziridine is a water soluble polymer. Thus, none of these have a membrane forming ability.

According to one embodiment of the invention the purification treatment comprises mixing for example by stirring or agitating a mixture of waste water and plant-derived anionic nanofibrillar cellulose. Stirring or agitating the mixture may enhance the purification treatment by allowing the anionic nanofibrillar cellulose to come in contact with a larger part of the waste water and the contaminant species therein. Stirring or agitation also keeps the reaction system aerated.

According to one embodiment of the invention the purification treatment comprises forming a layer of plant-derived anionic nanofibrillar cellulose hydrogel on a top of for example a filtration fabric or membrane, which then catches, by sorption or mechanical trapping, the metals and other contaminants of the waste water passing through. The layer of plant-derived anionic nanofibrillar cellulose hydrogel may be formed on a top of for example a filtration fabric or membrane either before contacting the waste water with the plant-derived anionic nanofibrillar cellulose or after mixing of plant-derived anionic nanofibrillar cellulose and waste water. Typically the purification treatment comprises filtration of the waste water through the layer of plant-derived anionic nanofibrillar cellulose hydrogel.

According to one embodiment the purification treatment further comprises filtration and/or centrifugation enabling trapping contaminant species contained in the waste water into a nanofibril network of said nanofibrillar cellulose. This enables the mechanical trapping of the contaminants.

The process may also comprise directing the recovered treated waste water to further purification treatments.

Known techniques in waste water treatment may be used to separate the used nanofibrillar cellulose from the waste water. The process may comprise recovering used plant-derived anionic nanofibrillar cellulose and optionally recovering metal ions from the recovered plant-derived anionic nanofibrillar cellulose. The process may also comprise recovering used nanofibrillar cellulose, removing water therefrom, and optionally directing the residue to incineration.

According to one embodiment of the invention the process or use comprises separating used nanofibrillar cellulose from treated waste water by utilizing filtration or centrifugation.

The water treatment of the invention may be carried out in various temperatures and conditions. The strength and flow behavior of the hydrogel which can be formed of the anionic nanofibrillar cellulose do not change in temperatures between approximately 4 and 80° C. The optimal conditions may vary depending on the waste water to be treated and other conditions of the process.

The plant-derived anionic nanofibrillar cellulose may be obtained from cellulose material originating from plant based cellulose or lignocellulose raw material, using chemical, mechanical, thermo-mechanical, or chemi-thermo-mechanical pulping processes. According to one, non-limiting embodiment, the cellulosic raw material does not comprise regenerated cellulose fibers, wherein the cellulose is cellulose II and/or recycled fibers.

According to one, non-limiting, aspect the plant-derived anionic nanofibrillar cellulose is none mercerized nanofibrillar cellulose.

In the field of water treatment, there is a need for improvement of water purification related to removing metals that are difficult to deposit. One example is the sodium ion ($Na^+$), which is a problematic metal in industrial waste waters. A typical wastewater treatment facility removes very little of certain elements from the waste stream, wherefore they are passed on to the environment. Accumulation of their salts, especially sodium, has detrimental effects on ecosystems, if they are let into the environment. The sodium salts restrict the development of plants by limiting supply of essential nutrients and by collapsing soil structure, which leads to lack of oxygen in rhizosphere. The problems related to sodium ions in industrial waste waters are also attributable to its very low affinity to form percipitates with common anions. The nanofibrillar cellulose of the invention, however, has been shown to remove sodium efficiently (e.g. FIG. 1). In the tests performed in relation to the present invention, over 50 wt.-% of the sodium ions where removed compared to the control sample. Furthermore, according to the test results, 1 g of added nanofibrillar cellulose per 50 ml waste water enables around or over 50 wt.-% decrease in several metals (Al, Fe, Mn, Na, Ni and Zn) in the treated water (FIGS. 1-4) as well as sulfur (S) content. The treated waste water in the tests contained several ions, i.e. it was real "multi-metal" or "multi-element" waste water.

In known prior art processes metals are bound from waste water with the aid of chemicals and the formed flocs are removed and discharged. There is little or no recycling of the metals. There is a need for improvement in treatment processes for metals that are difficult to deposit.

According to the present invention, the used nanofibrillar celluloses can be disposed of in an environmentally safe manner. The metals may be recycled from the used nanocellulose since they are either entrapped in the gel or electrically bound to fibrils, and may thus be released through appropriate treatments of the nanofibrillar cellulose. The used nanofibrillar cellulose may also be recovered and burned, whereby the cellulose will transform to ash and metals can easily be reused.

In the next section the invention is illustrated by examples.

EXAMPLES

Anionic nanofibrillar cellulose (NFC) was prepared. Firstly, primary alcohols of cellulose were oxidized to aldehydes and carboxylic acids through TEMPO oxidation by using sodium hypochlorite as the main oxidant to obtain oxidized cellulose with a certain carboxylate content expressed as mmol COOH/g pulp (determined by conductometric titration), where after the oxidized pulp was fibrillated to NFC.

Anionic pulp (0.80 mmol COOH/g pulp) was dispersed to water to a consistency of 2.5% (w/w) and run 4 times through a disperser (Atrex), through its series of counter rotating rotors. The disperser used had a diameter of 850 mm and rotation speed used was 1800 rpm. As a result, a viscous gel was obtained.

To verify the success of fibrillation, rheological measurements of the samples in the form of nanofibrillar cellulose hydrogels were carried out with a stress controlled rotational rheometer (ARG2, TA instruments, UK) equipped with four-bladed vane geometry. Samples were diluted with deionized water (200 g) to a concentration of 0.5 wt.-% and mixed with Waring Blender (LB20E*, 0.5 I) 3×10 sec (20 000 rpm) with short break between the mixing. Rheometer measurement was carried out for the sample. The diameters of the cylindrical sample cup and the vane were 30 mm and 28 mm, respectively, and the length was 42 mm. The steady state viscosity of the hydrogels was measured using a gradually increasing shear stress of 0.001-1000 Pa. After loading the samples to the rheometer they were allowed to rest for 5 min before the measurement is started, room temperature. The steady state viscosity was measured with a gradually increasing shear stress (proportional to applied torque) and the shear rate (proportional to angular velocity)

was measured. The reported viscosity (=shear stress/shear rate) at a certain shear stress was recorded after reaching a constant shear rate or after a maximum time of 2 min. The measurement was stopped when a shear rate of 1000 s$^{-1}$ was exceeded. The method is used for determining zero-shear viscosity and yield stress.

The zero-shear viscosity of the sample was 20 000 Pa·s and yield stress was 15 Pa.

The obtained plant-derived anionic nanofibrillar cellulose was used in the tests according to Example 1 to 3.

Example 1

Removal of Contaminants from Industrial Waste Water with the Help of Anionic Nanofibrillar Cellulose The purpose of the tests was to evaluate how much of the contaminants the anionic nanofibrillar cellulose was able to remove from waste water formed in an industrial mine after removal of valuable metals and before the precipitation of iron (pH 2.5).

The sample was prepared by adding 1 g of anionic nanofibrillar cellulose hydrogel (800 mmol COOH per kg, in 2.5 wt.-% concentration) with 50 ml of waste acidic mine waste water (pH 2.5) in centrifuge tube. The sample was agitated for 1 hour after which the sample was left to stand at room temperature for 24 hours, regarded as reaction time. After reaction time, the sample was agitated again for 10 minutes after which the sample was filtered through filter paper (Schleicher & Schüll, Blue Ribbon 589/3) into acid washed plastic bottles. Control sample was treated in the same way, however, without addition of anionic nanofibrillar cellulose.

The concentrations of aluminum (Al), iron (Fe), manganese (Mn), sodium (Na), nickel (Ni), zinc (Zn) and sulfur (S) ions were measured from the filtered samples by using inductively coupled plasma atomic emission spectroscopy (ICP-OES) apparatus. The amount (mol kg$^{-1}$) of each element removed by the anionic nanofibrillar cellulose could be calculated by subtracting the concentrations of the samples treated with nanofibrillar cellulose from the concentrations of the untreated control samples.

Industrial mine waste water contains various amounts of several contaminants from which supposedly the amount of most common ones were measured (aluminum, iron, nickel, manganese, zinc, sodium, sulfur). The metals in waste water are in their oxidized form and/or attached to other molecules or compounds. The sulfur in the waste water was believed to be in sulfate ion form.

TABLE 1

Sorption of metals and sulfate by anionic nanofibrillar cellulose in 24 hours reaction time

| Contaminant | Sorption of contaminant by dry cellulose nanofibrils [g/kg] | Sorption of contaminant by dry cellulose nanofibrils [mol/kg] | Amount of charge [mol/kg] |
|---|---|---|---|
| Cations | | | |
| Al$^{3+}$ | 202.36 | 7.50 | +22.5 |
| Fe$^{3+}$ | 150.78 | 2.70 | +8.1 |
| Ni$^{2+}$ | 0.70 | 0.012 | +0.024 |
| Mn$^{2+}$ | 82.41 | 1.50 | +3 |
| Zn$^{2+}$ | 0.24 | 0.0036 | +0.0072 |
| Na$^+$ | 68.97 | 3.00 | +3 |
| Σ | 505.46 | | +36.6312 |

TABLE 1-continued

Sorption of metals and sulfate by anionic nanofibrillar cellulose in 24 hours reaction time

| Contaminant | Sorption of contaminant by dry cellulose nanofibrils [g/kg] | Sorption of contaminant by dry cellulose nanofibrils [mol/kg] | Amount of charge [mol/kg] |
|---|---|---|---|
| Anions | | | |
| SO$_4^{2-}$ (as S) | 2383.00 | 24.80 | −49.6 |

Totally, anionic nanofibrillar cellulose was able to remove 0.5 kg of metals and 2.3 kg sulfate per 1 kg of anionic nanofibrillar cellulose in 24 hours reaction time.

Example 2

Removal of Contaminants from Industrial Waste Water with the Help of Anionic Nanofibrillar Cellulose The purpose of the tests was to evaluate how much of the contaminants the anionic nanofibrillar cellulose was able to remove from waste water produced in an industrial mine after removal of valuable metals and before the precipitation of iron (pH 2.5).

The sample was prepared by adding 1 g of anionic nanofibrillar cellulose hydrogel (800 mmol COOH per kg, 2.5 wt.-% concentration) with 50 ml of waste acidic mine waste water (pH 2.5) in a centrifuge tube. The sample was agitated for 1 hour after which the sample was left to sand at room temperature for 7 days regarded as reaction time. After reaction time, the sample was agitated again for 10 minutes after which the sample was filtered through filter paper (Schleicher & Schüll, Blue Ribbon 589/3) into acid washed plastic bottles. Control sample was treated in the same way, however, without addition of anionic nanofibrillar cellulose.

The concentrations of aluminum (Al), iron (Fe), manganese (Mn), sodium (Na), nickel (Ni), zinc (Zn) and sulfur (S) ions were measured from the filtered samples by using inductively coupled plasma atomic emission spectroscopy (ICP-OES) apparatus. The amount (mol kg$^{-1}$) of each element removed by the anionic nanofibrillar cellulose could be calculated by subtracting the concentrations of the samples treated with anionic nanofibrillar cellulose from the concentrations of the untreated control samples.

Industrial mine waste water contains various amount of several contaminants from which supposedly the amount of most common ones were measured (aluminum, iron, nickel, manganese, zinc, sodium, sulfur). The metals in waste water are in their oxidized form and attached to other molecules or compounds. The sulfur in the waste water was believed to be in sulfate ion form.

TABLE 2

Sorption of metals and sulfate by anionic cellulose nanofibrils in 7 days reaction time

| Contaminant | Sorption of contaminant by dry cellulose nanofibrils [g/kg] | Sorption of contaminant by dry cellulose nanofibrils [mol/kg] | Amount of charge [mol/kg] |
|---|---|---|---|
| Cations | | | |
| Al$^{3+}$ | 59.36 | 2.2 | +6.6 |
| Fe$^{3+}$ | 50.26 | 0.9 | +2.7 |
| Ni$^{2+}$ | 0.7 | 0.012 | +0.024 |

TABLE 2-continued

Sorption of metals and sulfate by anionic cellulose nanofibrils in 7 days reaction time

| Contaminant | Sorption of contaminant by dry cellulose nanofibrils [g/kg] | Sorption of contaminant by dry cellulose nanofibrils [mol/kg] | Amount of charge [mol/kg] |
|---|---|---|---|
| $Mn^{2+}$ | 13.74 | 0.25 | +0.5 |
| $Zn^{2+}$ | 0.07 | 0.001 | +0.002 |
| $Na^+$ | 528.76 | 23.0 | +23 |
| Σ Anions | 652.89 | | +32.826 |
| $SO_4^{2-}$ (as S) | 2181 | 22.7 | −45.4 |

Totally, the anionic nanofibrillar cellulose was able to remove 0.6 kg of metals and 2.1 kg sulfate per 1 kg of anionic nanofibrillar cellulose in 7 days reaction time.

Example 3

Treatment of Waste Water with Nanofibrillar Cellulose

In the test 20 g of anionic nanofibrillar cellulose hydrogel was added to a vial and mixed with 25 ml of industrial waste water (pH 3.2). Anionic cellulose nanofibrils had a concentration of 2.5 wt.-%. The vial was placed in a shaking machine (light speed) for 24 hours. After mixing the sample was passed through a filter paper (Schleicher & Schüll, Blue Ribbon 589/3) into acid washed plastic bottles. The concentrations of aluminum (Al), iron (Fe), manganese (Mn), sodium (Na), nickel (Ni), zinc (Zn) and sulfur (S) ions were measured from the filtered samples by using inductively coupled plasma atomic emission spectroscopy (ICP-OES) apparatus. Control sample was treated according to the same protocol except no anionic nanofibrillar cellulose was used.

The industrial waste water contains various amounts of several contaminants from which supposedly the amount of most common ones were measured (aluminum, iron, nickel, manganese, zinc, sodium, sulfur).

Figure 1:
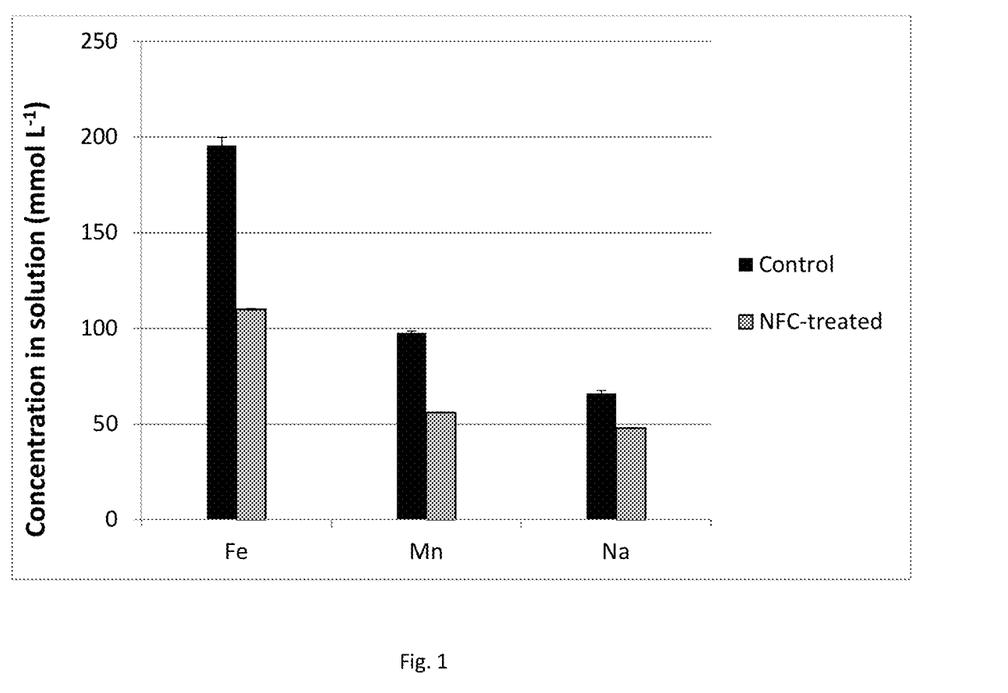
FIG. 1 shows test results; the amounts (mmol $L^{-1}$) of iron (Fe), manganese (Mn) and sodium (Na) left in the solution after treatment with anionic nanofibrillar cellulose.
Figure 2:
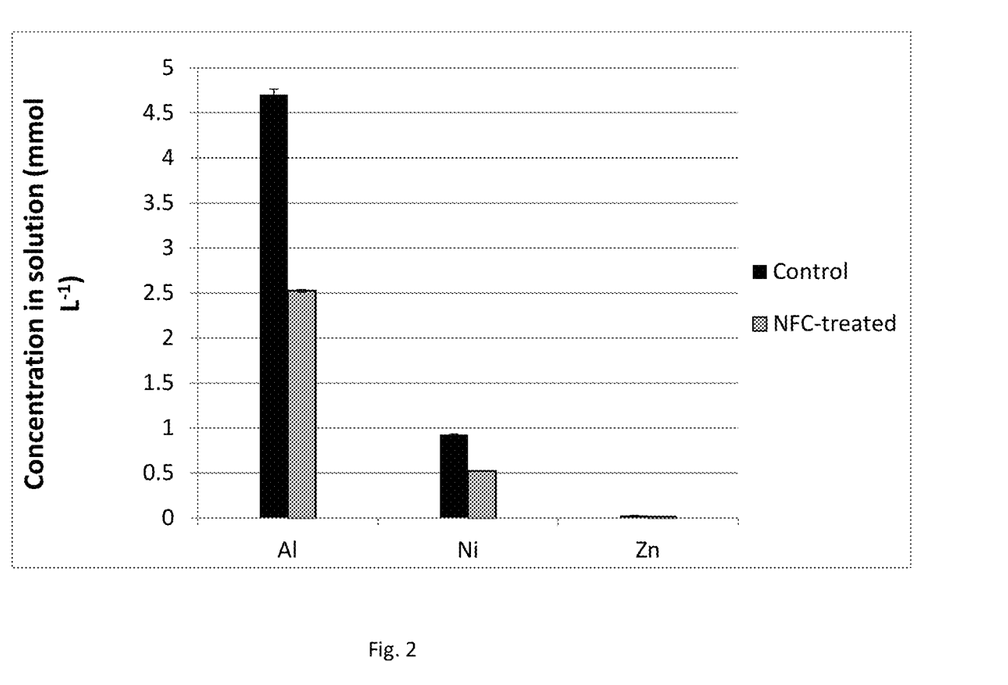
FIG. 2 shows test results; the amounts (mmol $L^{-1}$) of aluminum (Al), nickel (Ni) and zinc (Zn) left in the solution after treatment with anionic nanofibrillar cellulose.
Figure 3:
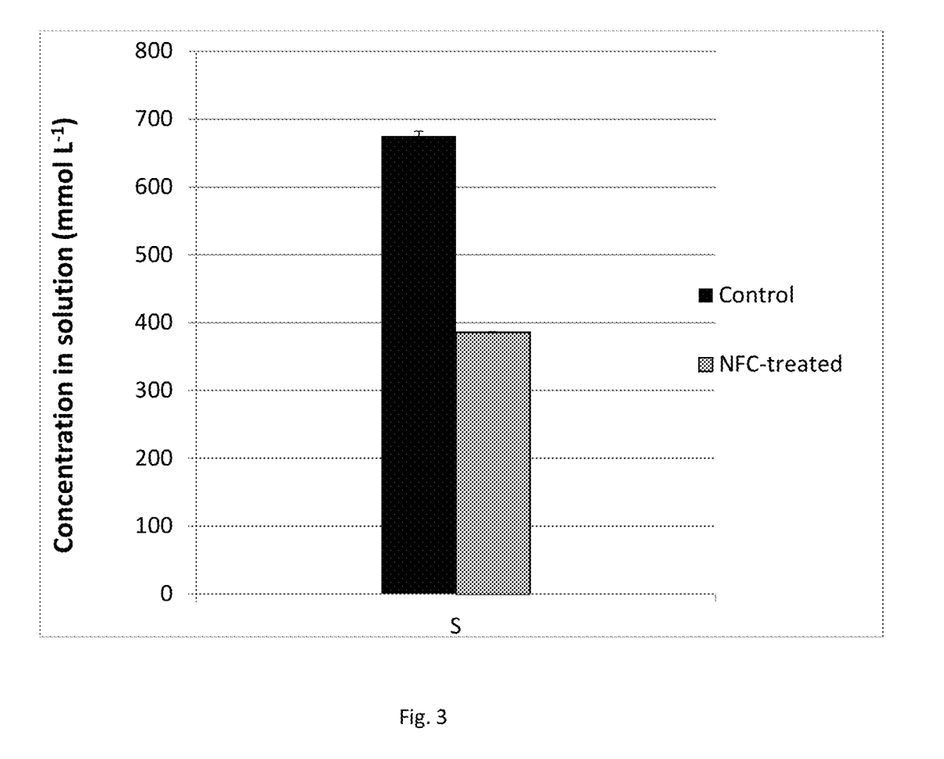
FIG. 3 shows test results; the amount (mmol $L^{-1}$) of sulfur (S) in the solution after treatment with anionic nanofibrillar cellulose.

FIGS. 1 to 3 show that anionic nanofibrillar cellulose was able to adsorb about half of the metals in the waste water. The waste water contained a wide variety of metals and other contaminants which competed with each other about the adsorption.

FIG. 1 shows the amounts (mmol $L^{-1}$) of Fe, Mn and Na left in the solution after treatment with anionic nanofibrillar cellulose, FIG. 2 shows the amounts (mmol $L^{-1}$) of Al, Ni and Zn left in the solution after treatment with anionic nanofibrillar cellulose and FIG. 3 shows the amount (mmol $L^{-1}$) of sulfur (S) in the solution after treatment with anionic nanofibrillar cellulose. "Control" refers to the untreated waste water sample and "NFC-treated" refers to the waste water treated with anionic nanofibrillar cellulose.

Example 4

1 g of filter pulp was weighed into the bottom of 60-mL plastic sample syringes. 5 and 10 g samples of undried NFC (equaling to 125 and 250 mg of dry NFC) were weighed into the tubes on the top of the filter pulp in three replicates. Sample syringes with filter pulp but without the NFC samples served as Controls. The sample syringes were connected to collection syringes with plastic hoses and the extraction units were attached to a vacuum extraction device. 25 mL of mine waste water was passed through the samples with a rate of 15 mL $h^{-1}$, collected into the collection syringes and transferred into plastic bottles. The vacuum extraction step was repeated with fresh waste water but the same NFC samples two more times. The collection syringes were changed after each of the three extraction rounds (Vac I, Vac II and Vac III) and all the samples were collected into separate bottles. The concentrations of aluminum (Al), iron (Fe), manganese (Mn) and nickel (Ni) ions were measured from all the collected samples by using inductively coupled plasma atomic emission spectroscopy (ICP-OES) apparatus. The amount (mol $kg^{-1}$) of each element removed by the anionic nanofibrillar cellulose could be calculated by subtracting the concentrations in the water samples treated with anionic nanofibrillar cellulose from the concentrations in the untreated control water samples.

Table 3. Sorption of aluminum (Al), iron (Fe), manganese (Mn) and nickel (Ni) from waste water by anionic nanofibrillar cellulose. Three fresh waste water portions were subsequently pushed in a vacuum extraction device through a layer of anionic nanofibrillar cellulose hydrogel of two different addition levels.

TABLE 3

| Contaminant | Extraction round | Sorption of contaminant [mol $kg^{-1}$ of NFC] | |
|---|---|---|---|
| | | 125 mg NFC addition | 250 mg NFC addition |
| Al | 25 ml/Vac I | 4.0 | 1.6 |
| | 25 ml/Vac II | 0.9 | 0.6 |
| | 25 ml/Vac III | −0.4 | 1.3 |
| | Σ 75 ml | Σ 4.6 | Σ 3.6 |
| Fe | 25 ml/Vac I | 3.0 | 1.3 |
| | 25 ml/Vac II | 0.5 | 0.5 |
| | 25 ml/Vac III | −0.3 | 0.6 |
| | Σ 75 ml | Σ 3.1 | Σ 2.5 |
| Mn | 25 ml/Vac I | 1.6 | 0.6 |
| | 25 ml/Vac II | 0.4 | 0.3 |
| | 25 ml/Vac III | 0.0 | 0.5 |
| | Σ 75 ml | Σ 2.0 | Σ 1.4 |
| Ni | 25 ml/Vac I | 0.010 | 0.005 |
| | 25 ml/Vac II | 0.003 | 0.002 |
| | 25 ml/Vac III | 0.002 | 0.003 |
| | Σ 75 ml | Σ 0.015 | Σ 0.009 |
| | Σ mol $kg^{-1}$ NFC | 9.7 | 7.5 |
| | Σ g $kg^{-1}$ NFC | 408.1 | 307.2 |

Sorption of the metals was naturally most efficient during the first vacuum extraction cycle and for dosage of 125 mg dry NFC the sorption capacity was reached during the second cycle. Interestingly, the sorption per mass of (dry) NFC was more efficient with the dosage of 125 mg (dry) NFC/25 ml than with the dosage of 250 mg (dry) NFC/25 ml waste water. Thus, it can be concluded that even a lower NFC dosage is sufficient for metal sorption. When the dosage was 125 mg (dry) NFC, the net sorption of metals (except for Al) was similar to that of Example 2 involving a different procedure and reaction time of 7 days.

The invention claimed is:
1. A process for treating waste water, the process comprising:
   a. providing plant-derived anionic nanofibrillar cellulose, said plant-derived anionic nanofibrillar cellulose having a zero sheer viscosity of 2,000 to 100,000 Pa*s, and a yield stress of 2 to 50 Pa, when dispersed to a concentration of 0.5 wt.-% in waste water;

b. adding said plant-derived anionic nanofibrillar cellulose in an amount of 0.005 to 25 kg/m³ waste water, based on the dry weight of the nanofibrillar cellulose, to carry out a purification treatment comprising sorption of ions included in the wastewater, to a hydrogel of said plant-derived anionic nanofibrillar cellulose;

c. separating the added plant-derived anionic nanofibrillar cellulose hydrogel with sorbed ions from the waste water, wherein said ions comprise positively charged metal ions and oxyanions selected from the group consisting of sulfate, sulfite, nitrate, phosphate, selenate, selenite, antimonite, dichromate and arsenate ions; and d. recovering treated waste water, the waste water having a pH of below 6.

2. The process according to claim 1, wherein said plant-derived anionic nanofibrillar cellulose has a zero sheer viscosity of 5,000 to 50,000 Pa·s when dispersed to a concentration of 0.5 wt.-% in waste water.

3. The process according to claim 1, wherein said plant-derived anionic nanofibrillar cellulose has a yield stress of 3 to 20 Pa, when dispersed to a concentration of 0.5 wt.-% in waste water.

4. The process according to claim 1, wherein said plant-derived anionic nanofibrillar cellulose comprises nanofibrillar cellulose manufactured from oxidized cellulosic raw material having a carboxylate content above 0.5 mmol/g based on the weight of the cellulosic raw material.

5. The process according to claim 1, wherein said plant-derived anionic nanofibrillar cellulose comprises nanofibrillar cellulose manufactured from carboxymethylated cellulosic raw material having a degree of substitution above 0.1.

6. The process according to claim 1, wherein said plant-derived anionic nanofibrillar cellulose comprises nanofibrillar cellulose manufactured from anionized cellulosic raw material having a degree of substitution of at least 0.08.

7. The process according to claim 1, wherein the process comprises adding plant-derived anionic nanofibrillar cellulose to waste water in an amount of 0.01 to 20 kg/m³ waste water based on the dry weight of the nanofibrillar cellulose.

8. The process according to claim 1, wherein the pH value of the waste water is below 4.

9. The process according to claim 1, wherein the metal ions comprise at least one of aluminum, sodium, iron, manganese, nickel and zinc ions.

10. The process according to claim 1, wherein the purification treatment further comprises mixing of said plant-derived anionic nanofibrillar cellulose and said waste water.

11. The process according to claim 1, wherein the the step of adding the plant-derived anionic nanofibrillar cellulose comprises forming a layer of the plant-derived anionic nanofibrillar cellulose hydrogel on a top of a filtration fabric or membrane.

12. The process according to claim 11, wherein the purification treatment further comprises passing said waste water through said layer of plant-derived anionic nanofibrillar cellulose hydrogel.

13. The process according to claim 1, wherein the the step of separating the added plant-derived anionic nanofibrillar cellulose hydrogel with ions sorbed thereto comprises filtration and/or centrifugation enabling trapping of the positively charged metal ions and the oxyanions included in the waste water into a nanofibril network of the plant-derived anionic nanofibrillar cellulose hydrogel.

14. The process according to claim 1, further comprising separating the added plant-derived anionic nanofibrillar cellulose hydrogel with ions sorbed thereto from treated waste water by utilizing filtration or centrifugation.

15. The process according to claim 1, wherein said plant-derived anionic nanofibrillar cellulose consists essentially of cellulose I.

16. The process according to claim 1, wherein said plant-derived anionic nanofibrillar cellulose comprises TEMPO oxidized nanofibrillar cellulose.

17. The process according to claim 1, wherein said plant-derived anionic nanofibrillar cellulose comprises carboxymethylated or sulphonated nanofibrillar cellulose.

18. The process according to claim 1, wherein the pH of the waste water is below 4.

* * * * *

UNITED STATES PATENT AND TRADEMARK OFFICE
CERTIFICATE OF CORRECTION

Page 1 of 1

PATENT NO. : 11,014,831 B2
APPLICATION NO. : 15/571021
DATED : May 25, 2021
INVENTOR(S) : Helina Hartikainen et al.

It is certified that error appears in the above-identified patent and that said Letters Patent is hereby corrected as shown below:

In the Claims

At Column 18, Line 65 (Claim 1), please delete "2,000 to 100,000 Pa*s" and insert --2,000 to 100,000 Pa·s-- therefor.

At Column 19, Line 5 (Claim 1), please delete "wastewater" and insert --waste water-- therefor.

At Column 20, Line 9 (Claim 11), please delete "wherein the the step" and insert --wherein the step-- therefor.

At Column 20, Line 18 (Claim 13), please delete "wherein the the step" and insert --wherein the step-- therefor.

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*